May 16, 1961     M. U. MORRIS     2,984,006

BUTTER DISPENSER

Filed Jan. 15, 1960     3 Sheets-Sheet 1

INVENTOR
MERCHANT U. MORRIS
BY Herbert A. McIntosh
ATTORNEY

May 16, 1961 M. U. MORRIS 2,984,006
BUTTER DISPENSER
Filed Jan. 15, 1960 3 Sheets-Sheet 2

INVENTOR
MERCHANT U. MORRIS
BY Herbert A. Venturini
ATTORNEY

May 16, 1961 M. U. MORRIS 2,984,006
BUTTER DISPENSER
Filed Jan. 15, 1960 3 Sheets-Sheet 3

INVENTOR
MERCHANT U. MORRIS
BY Herbert A. McIntire
ATTORNEY

United States Patent Office 2,984,006
Patented May 16, 1961

2,984,006
BUTTER DISPENSER

Merchant U. Morris, 6750 S. Meridian St., Indianapolis, Ind.; Henrietta S. Morris, administratrix of said Merchant U. Morris, deceased, assignor to herself Filed Jan. 15, 1960, Ser. No. 2,753

10 Claims. (Cl. 31—6)

This invention relates to a device for dispensing butter by slicing off predetermined thicknesses of pats of butter from the print of butter usually in the quarter pound sections and depositing the cut off piece of butter on a small dish commonly called a "tab." The invention comprises feeding of the dishes from a stacked supply to under a butter cut-off device and then bringing the butter on the dish to a position where it may be picked up.

A primary advantage of the invention resides in a simple and unique structure whereby the butter may be kept in a sanitary container under refrigeration if desired and cut off in the desired thicknesses of slices and placed upon individual dishes all without the intervention of an operator's hands or fingers.

A still further important object of the invention is to dispense butter in uniform, sliced thicknesses. A still further important object of the invention is to hold the butter normally in the print or molded form and only slice it off as the butter is to be dispensed so that the sliced butter does not have an opportunity to be exposed apart from the print. Normally butter when exposed to the atmosphere for any length of time will change in color.

It is to be noted that it is much easier to store butter in the molded form and in a much less space than to store the slices on dishes.

While these slices of butter are normally termed "pats" the slice is formed simply by cutting off a section from the print and not individually molded. Nevertheless, in the description herein to follow, the slices will be termed in the popular sense as pats and the dishes as tabs.

One particular form of the invention as now best known to me is described in reference to the accompanying drawings, in which Fig. 1 is a view in side elevation and partial section of a structure embodying the invention;

Figure 1:
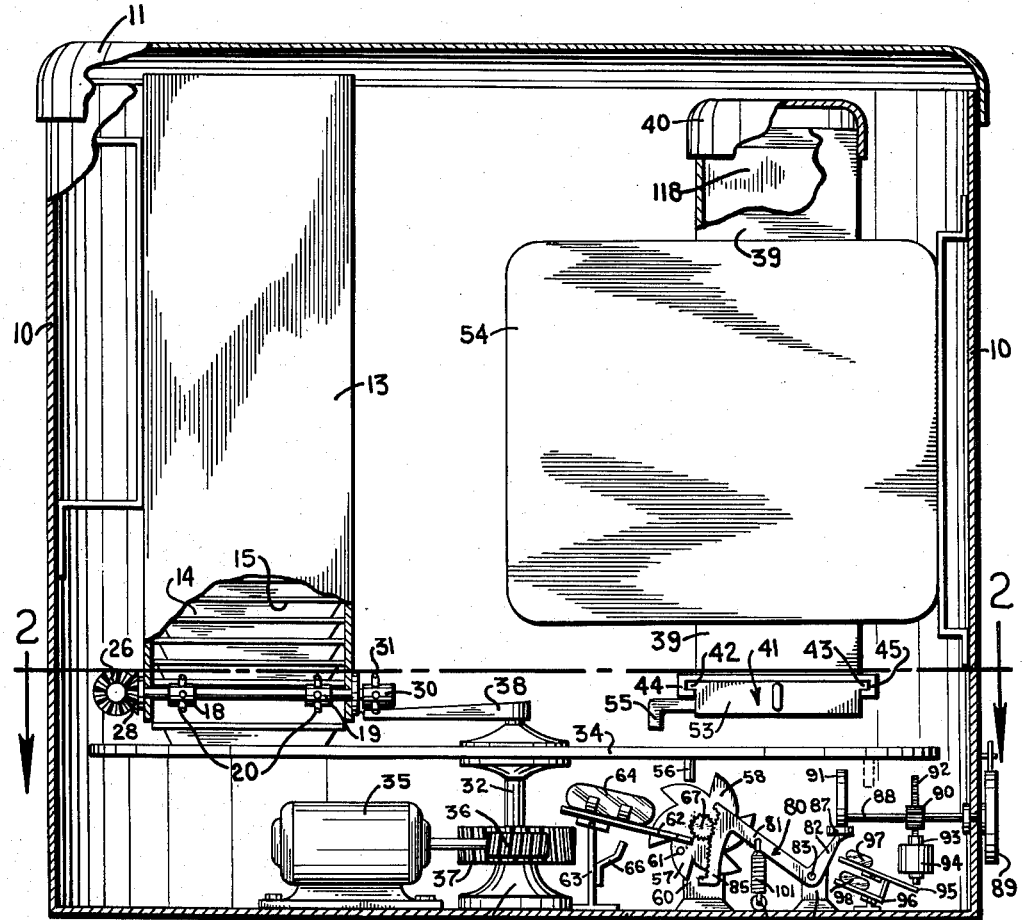

A housing 10 is herein shown as being cylindrical in nature and has a removable cover 11 fitted over its upper end. There is a floor 12. To one side of the housing 10, interiorally thereof, is mounted a vertically disposed tube 13 herein shown as being rectangular in shape where rectangular tabs 14 are to be employed for rectangular slices of butter. The tube 13 has internal dimensions which will permit receiving within the tube 13 a stack of tabs 14 one superimposed over the other, these tabs 14 being provided with top peripheral flanges 15 in each instance, the flanges 15 being spaced apart one from the other throughout the vertical columns of those tabs within the tube 13 as indicated in Fig. 1.

Figure 2:
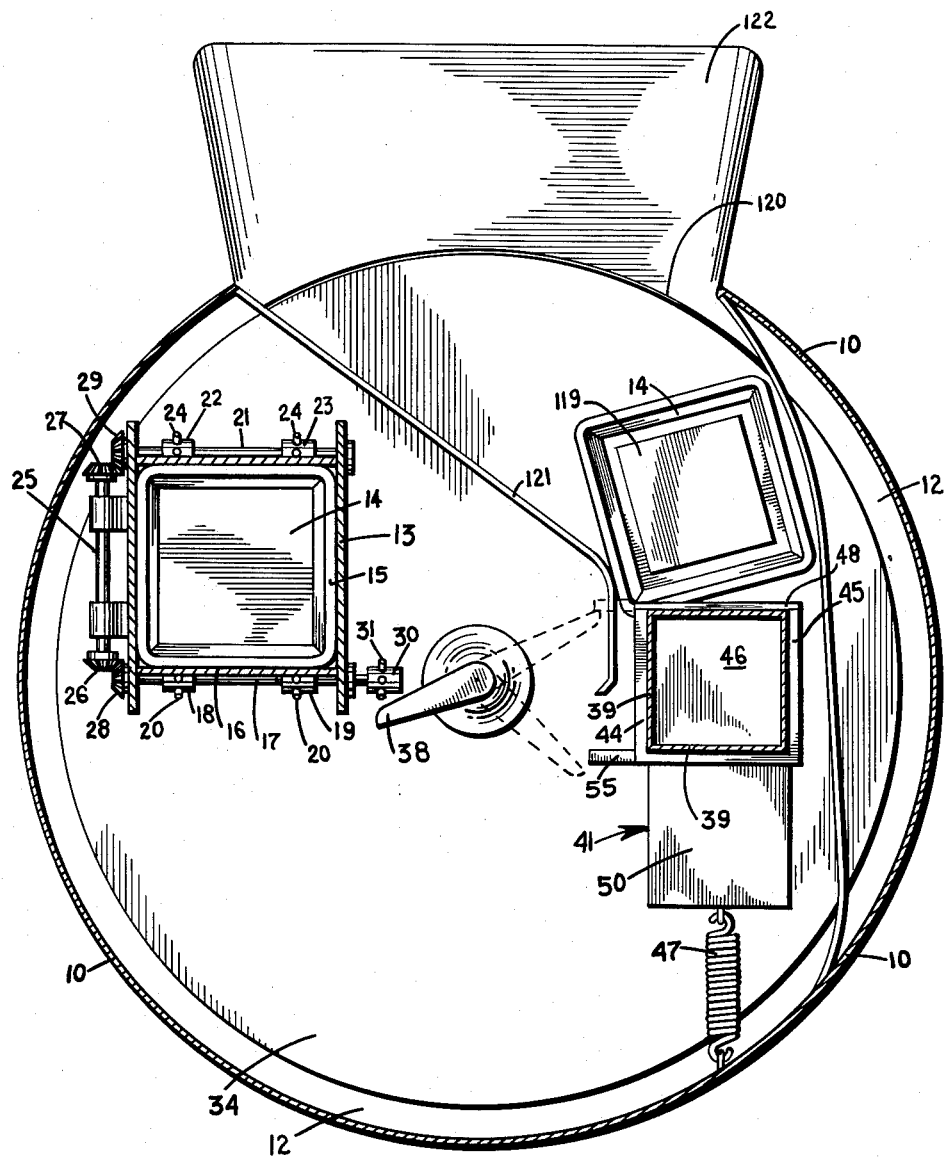
Fig. 2 is a view in transverse horizontal section on the line 2—2 in Fig. 1.

Referring to Fig. 2, the tube 13 is located within the housing 10 to have a face side 16 disposed substantially at a vertical diametrical plane across the housing 10. Across the bottom end of this face side 16 is disposed a shaft 17 and rotatably supported approximately parallel to the floor 12. A pair of finger members 18 and 19 are fixed to the shaft 17 in spaced apart relation therealong. These members 18 and 19 each carry a plurality of radially extending fingers 20.

On the opposite side of the tube 13 from the face side 16 there is disposed across the lower end of the tube a shaft 21 rotatably mounted and carrying spaced apart finger members 22 and 23 respectively, each of these members carrying a plurality of fingers 24 extending radially therefrom.

The locations of the shafts 17 and 21 and the extensions of the fingers 20 and 24 are such that the columns of tabs 14 are supported in the tube 13 by having the flanges 15 rest upon the fingers 20 and 24 respectively. The lower end of the tube 13 is open, and only by turning of the shafts 17 and 21 to drop the fingers 20 and 24 downwardly can the tabs 14 drop from the tube 13, and then only one at a time. The fingers 20 and 24 are so spaced around their members 18, 19 and 22, 23 that when one set of fingers is under a flange 15 of one tab 14, then as the shafts 17 and 21 are rotated, the flange 15 of the tab resting thereon will drop downwardly, and the next fingers will come in under the next above flange so that only one tab at a time is dropped from the tube 13.

In order to have the shafts 17 and 21 turning in unison and in the correct directions, the two shafts 17 and 21 are interconnected through a jackshaft 25, herein shown as two bevel gears at each end of the shaft 25 constantly intermeshing with bevel gears fixed on the shafts 17 and 21, these gears being designated by the numerals 26, 27 and 28, 29 respectively. In order to provide a means for turning the shaft 17 and the shaft 21 through the jackshaft 25, there is an operating member 30 fixed to the end of the shaft 17 outside of the tube 13 on the end of the shaft 17 oppositely disposed from the gear 28. This member 30 carries a plurality of fingers 31 extending radially from the member 30.

A shaft 32 is rotatably extended vertically from a base bearing 33 on the floor 12, and this shaft 32 extends upwardly to have a disk 34 fixed thereto. A motor 35 is mounted on the floor 12, and drives a worm 36 in constant mesh with a worm wheel 37 fixed on the shaft 32. The shaft 32 extends above the disk 34 to have fixed on its upper end an operating arm 38.

Above the disk 34 and to one side of the center thereof is mounted a tubular butter container 39. For rectangular prints of butter, the tube 39 will likewise be rectangular and of those dimensions which will permit a print of the butter to be entered from the top ends thereof and to drop freely downwardly within the tube 39. Normally the tube 39 will be closed by a cap 40. A member generally designated by the numeral 41 is supported preferably from the lower end portion of the tube 39 to slide across that end to form two different closures, one spaced below the other depending upon the positioning of the member 41. This member 41, in the form herein shown, Fig. 1, has outwardly extending side flanges 42 and 43 slidably engaging within tracks 44 and 45 respectively, which will hold the member 41 in sliding position across the lower end of the tube 39.

Figure 8:
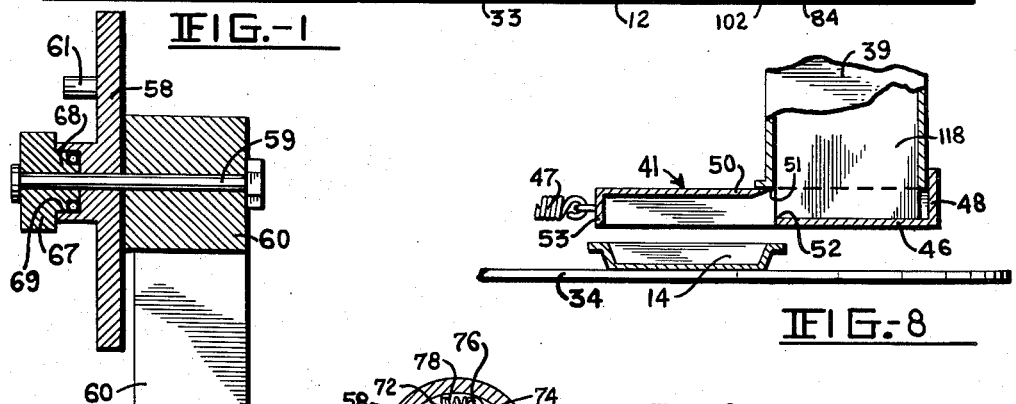
Fig. 8 is a detail in side elevation and section of the butter slicing mechanism.

Referring to Fig. 8 and also Fig. 2, the member 41 has a bottom closure 46 normally positioned across the bottom end of the tube 39, being biased to that position by means of a spring 47 fixed to the member 41 by one end and by the other end to any suitable stationary member such as the housing 10. The member 41 has an upturned end 48 which abuts the lower end of the tube 39 from the outside thereof to limit the travel of the member 41 to that position under the pull of the spring 47 to have the closure 46 across the tube 39 as indicated.

A second closure 50 is carried by the member 41 to one side of the closure 46, and spaced thereabove the desired thickness of a pat of butter. The upper closure 50 has a sharpened, knife edge 51 spaced above the terminal edge 52 of the closure 46, and this upper closure 50 extends to the left, as viewed in Fig. 8, to the end of the member 41 designated by the numeral 53. The member 41 is entirely open from its under side between the edge 52 and the end 53. The under side of the member 41, Fig. 8, including the under side of the closure 46 is spaced above the disk 34 a sufficient distance to receive a tab 14 thereunder freely.

The tube 39 is preferably encircled in part at least by a refrigerating unit 54, this unit being commercially obtainable and the details thereof are accordingly not herein shown since those details do not constitute a part of the present invention per se.

An arm 55 extends from a side of the member 41, being fixed thereto, into the path of the outer end of the arm 38 as it turns with the disk 34.

Figure 9:
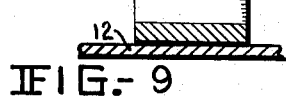
Fig. 9 is a vertical section through a star wheel drive.

A pin 56 is fixed to the disk 34 to extend vertically downwardly therefrom and be in the path of the teeth 57 of a wheel 58. This wheel, Fig. 9, is rotatably mounted on a shaft 59 carried by a post 60 mounted on the floor 12. The wheel 58 is provided with a pin 61 extending from a face thereof. A switch finger 62 is rockably mounted upon any suitable support, such as the bracket 63 to have a free end in the path of the wheel finger 61. The finger 62 may operate any suitable electric switch, herein shown as a mercury tube switch 64 held by the finger 62 and so mounted that upon the lowering of the free end of the finger 62, the switch 64 is a double throw switch will be in one closed position and when sufficiently elevated, the switch will be in another closed condition. A stop 66 is provided against which the switch finger 62 may drop to a lowermost position. Thus the mercury switch 64 is operated to different tilted positions to control two circuits which will later be described.

Figure 10:
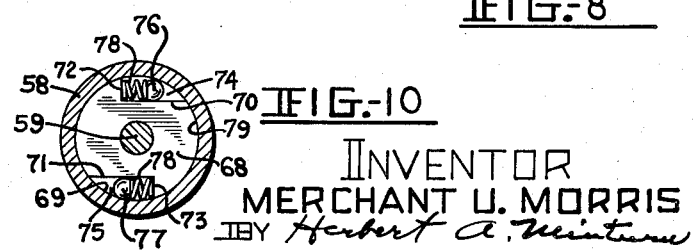
Fig. 10 is a detail in vertical section of a clutch for selectively turning the star wheel.

The wheel 58 is revolubly mounted on the shaft 59. A pinion gear 67 is also mounted revolubly on the shaft 59, and by a hub portion 68 enters into a bore 69 in the wheel 58. The hub 68 has notches formed on opposite sides thereof defined by parallel faces 70 and 71 terminating in faces 72 and 73 respectively in parrallel alignment with a diametrical plane through the axis of the shaft 59. The faces 70 and 71 extend to the outer peripheral portion of the hub 68. Then in each of these notches designated by the numerals 74 and 75 is placed respectively a ball 76 and 77 which in each instance is less in diameter than is the length of the faces 72 and 73 so that these balls 76 and 77 may roll against the faces 72 and 73 in one direction, and in the other direction against the inner cylindrical surface of the bore 69. The balls 76 and 77 are biased my means of springs 78 to roll toward this inner cylindrical surface designated by the numeral 79. This is illustrated in Fig. 10. This forms a clutch between the gear 67 and the wheel 58 whereby the wheel 58 may be turned through this clutch in a counterclockwise direction as viewed in relation to Figs. 1, 4, and 10.

A bell crank lever generally designated by the numeral 80 has a long arm 81 and a relatively short arm 82, and the lever 80 is pivoted intermediate these two arms on a pivot pin 83 supported by a bracket 84 in turn resting on the floor 12. A gear sector 85 is fixed on the outer free end of the arm 81 and is in constant mesh with the gear 67. This arm 81 is biased to a down position as indicated in Fig. 4, wherein a stop 86 rest against the gear 67.

The shorter arm 82 terminates in a pad 87 normally horizontally disposed when the arm 82 is in its upper position. A shaft 88 is rotatably carried by the housing 10 to extend substantially inwardly from an outer end carried dialing knob 89. This shaft 88 carries a spur gear 90 between the housing 10 and a cam 91 fixed to the inner end portion of the shaft 88. The pad 87 when in its upper position normally bears against the under side of the cam 91.

Figure 4:
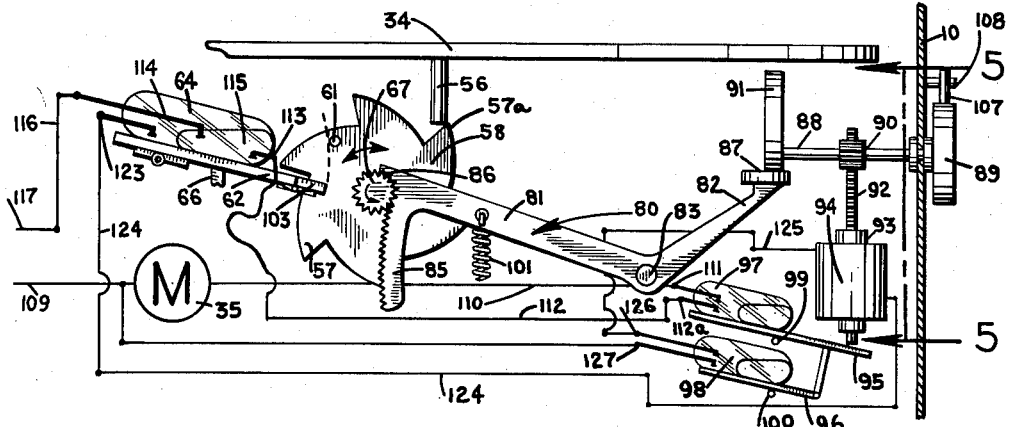
Fig. 4 is a diagrammatic view of the control system operating the dispenser.
Figure 5:
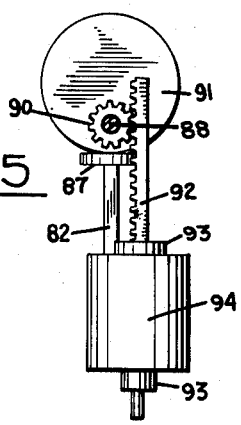
Fig. 5 is an enlarged view in section on the line 5—5 in Fig. 4.

A rack bar 92 is in constant mesh with the spur gear 90, and extends vertically downwardly therefrom to interconnect with an armature 93 of a solenoid magnet 94, Figs. 4 and 5.

The lower end of the armature 93 extends downwardly to be in the path of an outer end of a switch arm 95, and operatively connected to this switch arm 95 is a second arm or switch carrier 96. In the form herein shown, each of these arms 95 and 96 carries a mercury tube switch 97 and 98 respectively mounted on one side of the pivots 99 and 100 so as to tend to bias the switch arm end 95 to an uppermost position, the arms 95 and 96 being normally held in positions as indicated in Fig. 4 where the switches 97 and 98 are tilted to "off" circuit conditions. That is the circuits in which the switches 97 and 98 are inserted are open in the tilted positions. The biasing of the bell crank lever 80 to the position indicated in Fig. 4 is had by the spring 101 interconnecting the arm 81 with any suitable lower connection such as through an eye 102 secured to the floor 12.

Figure 7:
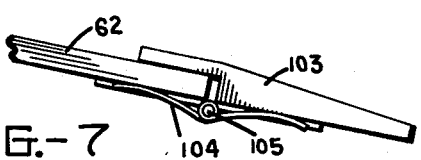
Fig. 7 is a detail in side elevation of the tip of a switch operating lever.
Figure 3:
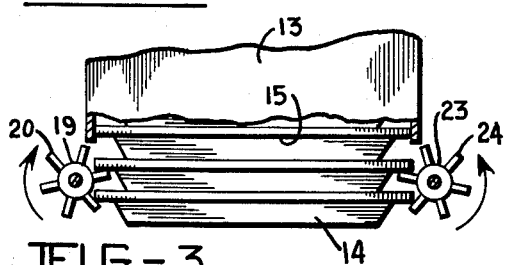
Fig. 3 is a detail in side elevation and partial section on an enlarged scale of a device for determining the number of tabs to be dispensed one after another.

Referring to Fig. 4, the switch operating arm 62 is provided with a tip 103 which may be rocked downwardly while the arm 62 rests on the arm 66 such as would be occasioned by counter-clockwise turning of the wheel 58 when the pin 61 is positioned above that tip 103. The tip 103 is biased to a position as indicated in Fig. 7 wherein the tip 103 is in fact an extension of the arm 62, this biasing being had in the present instance by means of a torsion spring 104 about the pintle 105 about which the tip 103 swings.

Operation

The "zero" position of the control mechanism as best illustrated in Fig. 4 will have the wheel 58 in the position indicated wherein the pin 61 will be above the tip 103, and the pin 56 of the disk 34 will have carried one tooth 57a to the position indicated wherein the lower end of the pin 56 will be able to travel on past that tooth 57a as the disk 34 turns in a counterclockwise direction. In this "zero" position, the control knob 89 will have a stop finger 107 abutting a fixed pin 108 carried by the housing 10. The present showing is set up to have the possibility of dispensing one pat of butter; two pats of butter; three pats of butter; four pats of butter; five pats of butter; six pats of butter; or in the alternative one pat of butter at a time one after another. In this "zero" position the cam 91 will be positioned to have its major portion turned upwardly in relation to the pad 87, and the solenoid armature 93 will be centrally disposed within the solenoid winding. The two switches 97 and 98 will be open, and the switch 64 will be closed in relation to one circuit when in its tip lowered position and the arm 62 is resting against the stop 66.

Now assuming that one pat only is to be dispensed. The knob 89 is turned counterclockwise, Fig. 6, to the numeral 1 to have the finger 107 directed theretoward.

Upon turning the knob 89, the armature 93 will be lifted from its normal central position in relation to the solenoid 94 and the cam 91 will be rotated to depress the pad 87 a predetermined distance which will cause the gear sector 85 to revolve the pinion gear 67 that distance in clutch engagement with the wheel 58 to carry the wheel 58 around counterclockwise and position its pin 61 below the tip 103, by causing the pin 61 to rock the tip 103 downwardly so that the pin 61 comes to be disposed under that tip 103. When the armature 93 is lifted, the two tubes 97 and 98 rock under their bias to closed circuit positions. A circuit is established from one side of the line 109 through the motor 35, and the conductor 110 to one terminal 111 of the switch 97, and a second conductor 112 leads from the other terminal 112a of the switch 97 to a terminal 113 of the switch 64. The mercury in the tube 64 will cover the inner end of the terminal 113 within the tube, and complete a circuit therethrough to a terminal element 114 which has an end disposed centrally of the length of the tube 64 to be always immersed in the mercury designated by the numeral 115 regardless of whether the tube 64 is tilted upwardly or tilted downwardly. The conductor 116 leads from the member 114 externally of the switch 64 to the other side of the line 117. This circuit thus defined sets the motor 35 into operation and starts the turning of the disk 34. This disk 34 will turn until the arm 38 comes around and engages one of the teeth 31 at the tab holding column and travels against that tooth and carries it around sufficiently to cause one of the tabs to be dropped out from the bottom of the tube 13. Incidentally, there are an equal number of teeth 20, 24, and 31 disposed about their respective holders so that the travel of the arm 38 around to rotate the shaft 17 will always be in relation to the positioning of the teeth 20 and 24 in proper sequence for dropping one tab at a time while supporting the column thereabove the dropped tab.

Continued turning of the disk 34 carries the dropped tab on around to bring it eventually under the butter holding tube 39. As the tab reaches the position indicated in Fig. 8 where it is directly under the knife 50; the arm 38 will bear against the arm 55 as the tab 14 travels with the movement of the disk 34; the member 50 will carry the cutting edge 51 through the lower end portion of the butter designated by the numeral 118; the lower supporting member 46 passing out from under the pat being cut off while the upper floor 50 comes under the column of butter 118 thereabove forming the thickness of the pat as defined between the lower floor 46 and the under side of the upper floor 50; so that the cut off pat will then drop under the influence of gravity into the tab 14 thereunder, the disk 34 turning throughout this operation. When the arm 38 passes the arm 55 at its extreme end of travel, the return spring 47 will operate to restore the two floors 46 and 50 to their original positions as indicated in Fig. 8, while the tab 14 carries its pat 119 on around to an opening 120 through the side wall 10 and allows the pat to slide out along the guiding finger 121, preferably sliding out onto an apron 122 where the tab with its butter pat may be picked up. The motor 35 will come to a stop when the arm 62 is momentarily lifted by the pin 61 on the wheel 58 causing the circuit above defined to be disconnected or opened between the terminals 113 and 114, whereupon a new circuit is set up through the terminal 114 and the terminal 123 of the switch 64. This circuit may be traced from the side of the line 117 to the conductor 116, the terminal 114 of the switch 64, the terminal 123 thereof, the conductor 124 to the solenoid 94 to energize the winding thereof through the continued portion of the circuit consisting of the conductor 125 and the terminals 126 and 127 of the switch 98 which have been bridged interiorally of the switch 98 by the mercury therein. This energization of the solenoid 94 pulls the armature 93 back to its central position, and in that travel back, the gear 90 being in mesh with the rack bar 92 connected to the armature 93 will rotate the shaft 88 to restore the cam 91 back to its zero position allowing the spring 101 to raise the pad 87 and follow the contour of the cam 91 during that action. Simultaneously with that action, the gear sector 85 is traveling back down to its lowermost position, the spur gear 67 idling without driving the wheel 58 through the clutch mechanism as has been described. This leaves the pin 61 in its uppermost position above the switch member tip 103.

Thus it is to be seen that but one pat of butter has been dispensed.

Figure 6:
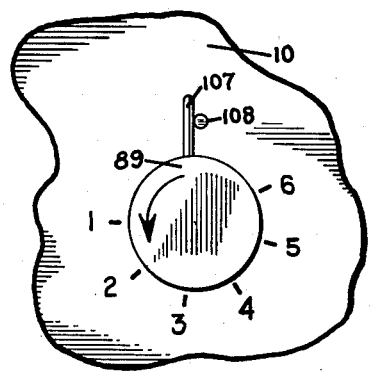
Fig. 6 is a detail in vertical elevation of the control knob.

For multiple pats of butter to be dispensed, the knob 89 is turned to the corresponding number as indicated in Fig. 6, which means that the pin 61 has been brought down past the finger 103 and carried around in a counterclockwise direction a distance to correspond to the number of teeth 57a required to be contacted by the pin 56 to effect the opening and closing of circuits as above described. The circuit through the solenoid 94 will of course not be closed until the switch 64 is tilted to its upper position which will only occur when the last pat of butter has been dispensed corresponding to the last tooth 57 being turned to that position where the disk pin 56 will travel therepast.

Thus it is to be seen that I have provided a positive acting butter dispenser which may dispense a varying number of pats upon one setting, and the control mechanism will return to a zero setting ready for repeat operation depending upon the operation of the overall control knob. While my invention has been herein shown in the one specific form, it is obvious that structural changes may be employed, for example the circuits and use of contacts rather than mercury tubes, and other structural elements, all without departing from the spirit of the invention, and I therefore do not desire to be limited to this precise form beyond the limitations which may be set forth in the following claims.

I claim:

1. A butter dispenser comprising a holder for a column of butter tabs, one tab superimposed over the other; a holder for a column of butter; means feeding one tab after another from the bottom of the tab holder; a floor shiftable across said butter holder; a butter slicing member normally shiftably carried at one side of said butter holder adjacent said floor; means carrying a tab fed from the tab holder to under said floor; means actuating said tab feeding means, said floor, and said slicing member in timed relation with slicing of a pat of butter from said butter column, shifting said floor and dropping the pat onto said tab; and means operating said actuating means comprising a motor driving said carrying means, said tab feeding means, said slicing member, and said floor; a drive motor circuit including a source of electricity; means opening and closing said circuit responsive to travel of said carrying means; timing means retaining said circuit closed for a selected period of operation of said tab feeding means and said butter slicing member; means modifying said circuit, holding it open until a subsequent period of said operation is set up to close the circuit.

2. The structure of claim 1 in which said floor is spaced below and to one side of said slicing member to have the slicing member a distance above the floor equal to the desired thickness of a pat of butter, and there is a second floor spaced above the first floor at approximately the same elevation as that of said slicing member in relation to the second floor, said slicing member and said second floor being biased to a position normally removed from under said butter column.

3. The structure of claim 1, in which said carrying means comprises a disk revolubly mounted under said tab and butter column holding means, and there is an arm turning with said disk, and members at both said tab feeding means and said slicing member and said floors in the path of said arm constituting said actuating means.

4. The structure of claim 1 in which there is selector means to manually set from a zero condition to close said circuit and to determine the length of said operation period, and there is means restoring said selector means to its zero condition.

5. The structure of claim 4 in which said restoring means includes a motor operating upon the opening of said circuit.

6. A butter dispensing device comprising a rotatable disc; a tab holder above said disc; a butter holder above and spaced from said tab holder; means dropping one tab at a time onto said disc; means for slicing off a pat of butter from the underside of the butter holder; said disk carrying the dropped tab around and across under said butter holder to receive said pat as the tab travels around on the disk; means moved by travel of the disk actuating said tab dropping means and said butter slicing means; a motor turning said disk; a motor control switch; a circuit including a source of electricity, said motor, and said switch; said switch normally being closed; and a member driven by travel of said disk opening said switch to deenergize said motor and thereby stopping rotation of the disk following dropping of said pat onto a tab.

7. The structure of claim 6 in which there is means closing said switch following its said opening; a second switch in series with said first switch in said circuit; and means actuating said second switch to a closed condition to restart to set said motor into operation.

8. The structure of claim 7 in which there is a shiftable selector member determining the number of revolutions of said disk between the closing and opening of said first switch corresponding to the number of butter pats desired to be dispensed; means between said selector member and said disk travel member withholding that travel member from said first switch for said number of disk revolutions.

9. The structure of claim 8 in which said disk travel member comprises a toothed member and there is a pin carried by said disk in the path of said toothed member moving it a tooth increment for each disk revolution; a first switch actuating member; a pin carried by the toothed member in the path of said switch actuating member; said means between said disk travel member and said selector member comprising means for moving said toothed member from a zero position a total number of tooth increments oppositely from travel of said disk for the number of disk revolutions desired; and means restoring said selector member to a zero position following said number of disk revolutions.

10. In a dispenser, a rotatable disk operating the dispenser; and a control for sequence of dispenser operation comprising a tooth wheel; a pawl carried by the disk in the path of the teeth of said wheel; a disk driving motor; a source of electricity; a switch biased to a closed condition and having an actuating member; a circuit including said motor, source of electricity, and said switch; a pin carried by said wheel in the path of said actuating member to open said switch momentarily as the pin passes thereagainst and past; a wheel setting member; a cam normally bearing against a portion of said member, selective movement of the cam turning said wheel to carry said pin from said actuating member a distance corresponding to reverse pin travel set up by the desired number of disk movements carrying said pawl against one wheel tooth after another; a second switch biased to an open condition and closed by said pin as said first switch is opened thereby; a second motor means; a third switch; a second circuit including said source of electricity, said second and third switches, in series, and said second motor; means between said second motor and said cam shifting the cam and said wheel setting member restoring said setting member to a zero disk revolution position upon closing of said third circuit switch and a fourth switch biased to an open condition, said fourth switch being in said first circuit in series with said first switch; said second motor means opening said third and fourth switches upon closing of said first switch.

References Cited in the file of this patent
UNITED STATES PATENTS

| 1,580,498 | Knox et al. | Apr. 13, 1926 |
| 2,529,850 | Scharsch | Nov. 14, 1950 |